J. WALKER.
Hoe.
No. 197,956.                    Patented Dec. 11, 1877.
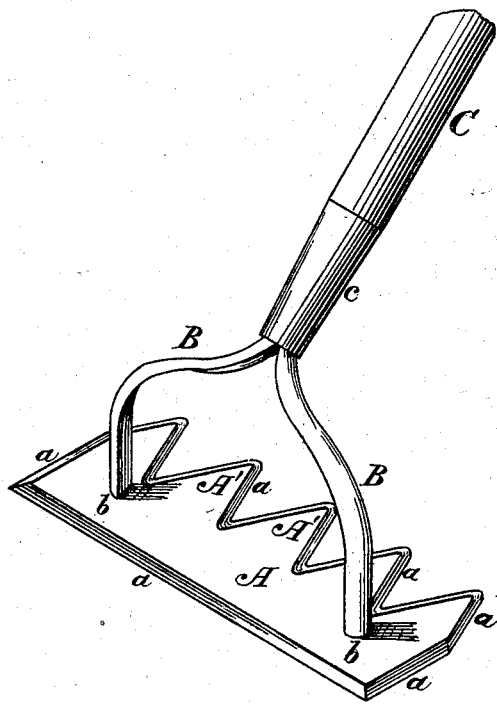

UNITED STATES PATENT OFFICE.

JONATHAN WALKER, OF NORTON, MICHIGAN, ASSIGNOR OF ONE-HALF HIS RIGHT TO CHARLES CULVER.

IMPROVEMENT IN HOES.

Specification forming part of Letters Patent No. 197,956, dated December 11, 1877; application filed September 10, 1877.

*To all whom it may concern:*

Be it known that I, JONATHAN WALKER, of Norton, in the county of Muskegon, in the State of Michigan, have invented certain Improvements in Hoes for Weeding and other Purposes, of which the following is a specification:

The object of this invention is to furnish a hoe in such form and condition that it can be used for a good purpose in a variety of ways and directions, and be effective in whichever way it is used; and the invention consists in the peculiar construction of the hoe, as will be fully hereinafter described.

In the drawing, A represents the blade of the hoe, of thin steel, of the right temper in hardness to carry a good edge, and parallelogram in form. A' represents teeth upon the forward edge of blade A, nearly resembling in form the coarse teeth of a crosscut-saw. The blade A has its other three straight edges beveled from the top side to form a sharp edge, $a$, at its lower side, which bevel is continued around all the teeth, so that a sharp cutting-edge is produced on the edges of the teeth, as well as on the edges of the plate having the straight sides.

B B are the two bent prongs that attach the handle to the plate A, are each fastened to plate A at $b$, secured thereto by riveting or otherwise, and come together at the lower end of the handle, where they may be welded together to form the tang that secures the hoe to its handle; or a piece of iron may be split to form the prongs B, leaving that part which forms the tang whole, and then bent in the form to be attached to the hoe, and give to the hoe an easy working position, whether the hoe is drawn toward or pushed from the operator, or its end used to be thrust into a narrow place to loosen the soil and destroy weeds therein by cutting them below the surface of the earth.

It will be observed that the bifurcated prongs B are attached to the plate A at a distance from the end of the plate, so as to give a free opportunity to the end of the hoe to enter the ground, and not have the prongs interfere or strike the solid earth; and it will also be further observed that the prongs are of such shape and bent in such form that they brace against the force used to operate the hoe in any direction, and that there is no danger of clogging the hoe with either dirt or weeds in using it.

C is the handle, which is attached to the bifurcated prongs B in the usual method of a tang forced into the lower end of the handle, and a ferrule or band, $c$, surrounds the handle to prevent splitting.

A hoe thus constructed, when drawn toward the operator, will surely cut every weed at the depth the hoe is forced into the ground. It can also be shoved from the operator and become a "scuffle," or it can be forced sidewise in either direction and be effective.

I am aware that hoes having serrated edges have been used, and I do not claim a hoe with a serrated edge; but What I do claim is—

1. A hoe having one serrated or toothed cutting-edge, A', and the three other right-angled edges sharp and straight, substantially as and for the purposes described.

2. A hoe composed of plate A, having one serrated or toothed cutting-edge, A', and three right-angled straight cutting-edges, $a$, and a handle, C, connected to the plate A by the bent bifurcated prongs B, constructed in the manner and for the purpose described.

JONATHAN WALKER.

Witnesses:
HORATIO N. ROWE,
CHAS. C. CHAMBERLAIN.